July 16, 1968   R. L. LICH   3,392,680
RAILWAY MOTOR TRUCK WITH BOLSTER RESILIENTLY MOUNTED
Filed Sept. 20, 1965   2 Sheets-Sheet 1
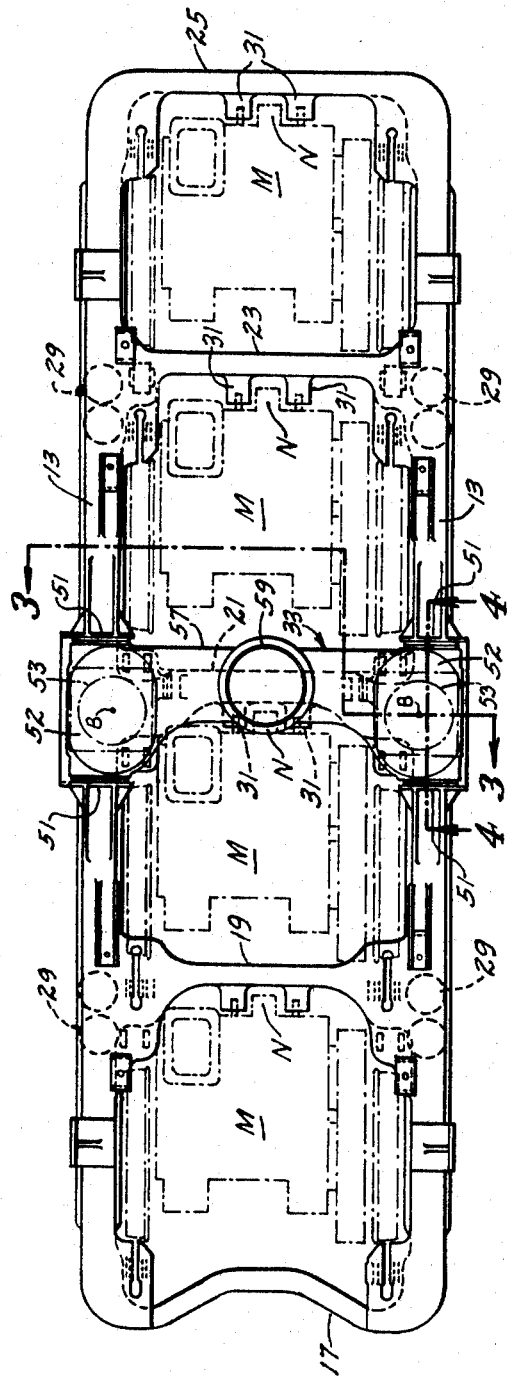
INVENTOR.
RICHARD L. LICH
BY Bedell & Burgess
ATTORNEYS July 16, 1968  R. L. LICH  3,392,680
RAILWAY MOTOR TRUCK WITH BOLSTER RESILIENTLY MOUNTED
Filed Sept. 20, 1965  2 Sheets-Sheet 2

INVENTOR.
RICHARD L. LICH
BY
*Badell & Burgess*
ATTORNEYS

United States Patent Office 3,392,680
Patented July 16, 1968

3,392,680
RAILWAY MOTOR TRUCK WITH BOLSTER
RESILIENTLY MOUNTED
Richard L. Lich, St. Louis, Mo., assignor to General Steel
Industries, Inc., Granite City, Ill., a corporation of
Delaware
Filed Sept. 20, 1965, Ser. No. 488,466
10 Claims. (Cl. 105—182)

ABSTRACT OF THE DISCLOSURE

A railway motor truck in which the vehicle body supports are at the sides and are so positioned lengthwise of the truck as to provide substantially equal distribution of the vertical load to the axles, the truck having a vertically unloaded vertical axis pivot forming structure centered transversely of the truck but offset lengthwise of the truck from the body support centers to clear the motor associated with an adjacent axle. In the preferred embodiment, the body support bearings are upwardly facing surfaces elongated lengthwise of the truck on the similarly elongated end portions of a bolster mounted for lateral movement on rubber pads carried by the truck frame side members midway between the equalizer springs by which the truck frame is supported on the axles, the bolster having a transverse portion offset lengthwise of the truck from the center of its end portions and including the vertically unloaded pivot forming structure. With this arrangement the necessary offset of the pivot forming structure will not disturb the desirable equal distribution of load to the axles.

---

The invention relates to railway rolling stock and consists particularly in an electric railway motor truck with an improved bolster arrangement.

It is advantageous, in multiple axle trucks, to have all the motors facing in the same direction lengthwise of the truck, but such placement of the motors in a truck with an even number of axles requires that the spacing of the two axles adjacent the truck center be spaced apart a greater distance than that occupied by the motors and their supports, to provide clearance between the adjacent motor facing the center of the truck and the transverse load supporting bolster at the center of the truck, the position of the latter being dictated by the requirement that the bolster be symmetrically located with respect to the axles.

It accordingly is a main object of the invention to provide an electric railway motor truck in which the spacing of the two middle axles from each other resulting from possible interference between one of the motors and the truck bolster is minimized. A further object is to provide a lateral motion bolster having simple but effective snubbing means.

The foregoing and additional more detailed objects and advantages will be achieved by the construction described hereinafter and illustrated in the accompanying drawings, in which:

FIG. 1 is a plan view of an electric railway motor truck embodying the invention.

FIG. 2 is a side elevational view of the truck illustrated in FIG. 1.

Figure 3:
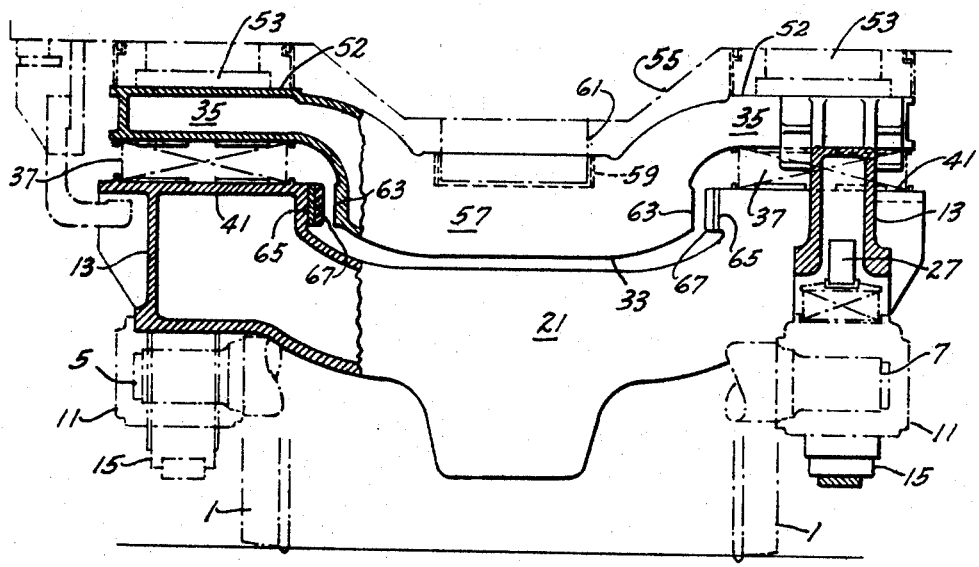
FIG. 3 is a transverse vertical sectional view along line 3—3 of FIG. 1.
Figure 4:
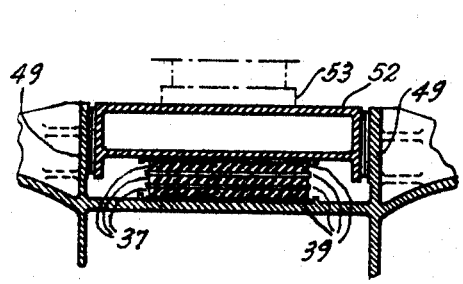
FIG. 4 is a fragmentary longitudinal vertical sectional view along line 4—4 of FIG. 1.

The truck has four wheel and axle assemblies, comprising pairs of flanged wheels 1 and axles 3, 5, 7 and 9, spaced apart from each other lengthwise of the truck. Journal boxes 11 are rotatably mounted on the ends of the axles. A rigid truck frame includes transversely spaced longitudinally extending side members 13 positioned laterally outboard of wheels 1, and formed with pairs of depending pedestal legs 15 embracing and vertically slidably receiving between them journal boxes 11. Side members 13 are rigidly connected to each other by a transverse end transom 17, spaced transverse intermediate transoms 19, 21 and 23 and transverse end transoms 25. For resiliently supporting frame 13–25, drop equalizer beams 27 are supported at their ends on journal boxes 11 of axles 3 and 5, and 7 and 9, respectively, and support, intermediate their ends, coil spring groups, which in turn underlyingly support frame side members 13.

Transom members 19, 21, 23 and 25 are each provided with depending brackets 31 all projecting in the same direction lengthwise of the truck and supporting noses N of traction motors M, which are journaled on and geared to axles 3, 5, 7 and 9 in the usual manner.

From FIG. 1 it will be noted that nose N of motor M on axle 5 extends substantially to the transverse center line of the truck, transom 21, by which this motor nose is supported, being offset lengthwise of the truck from the transverse center line of the truck to permit axle 5 to be positioned as close to the transverse center line as axle 7, the distance of which from the transverse center line is dictated by other factors. Accordingly, with the present arrangement, the distance of the middle axles from the transverse center line is not dictated by the requirement for motor nose clearance relative to center transom 21.

For transferring the body load to the truck and providing a center about which the truck can swivel relative to the body for operation around curves, and for permitting controlled relative transverse movements of the body relative to the truck to prevent the transmission to the body of all forces received by the truck frame from lateral irregularities in the track, transverse bolster 33 is provided. To provide the desired lateral motion, bolster 33 is supported at its end portions 35 on flat sandwiches comprising horizontal pads 37 of elastomeric material, such as rubber, interleaved and outwardly bounded with metal plates 39, seated on a widened horizontal top wall 41 of frame side members 13 between axles 5 and 7 and adjacent the ends of center transom 21.

End portions 35 of bolster 33 are elongated lengthwise of the truck and are formed with transverse vertical end surfaces 43 to which are secured hardened steel chafing plates which are normally in slidable engagement with similar plates 47 on opposing transverse faces 49 of spaced upstanding abutments 51 on truck side members 13.

The top surfaces 52 of bolster end portions 35 are horizontal and are machined to a smooth finish to slidably support feet 53 depending from underframe bolster 55 at each side of the underframe and normally centered at the balance points B at each side of the truck frame with respect to its supports from the axles, i.e., on the transverse center line of the truck which is midway between the equalizer spring groups 29, 29 by which the frame is supported on the axles so as to transmit the body load in equal proportions to the four axles.

To provide for swiveling of the truck relative to the underframe, for rounding curves, while avoiding interference with nose N of axle 5 motor M, the intermediate portion 57 of bolster 33 is offset lengthwise of the truck from axle 5, and is formed at its center, also offset in the same direction lengthwise of the truck, with a vertical cylindrical recess 59, in which is pivotally received a cylindrical boss 61 depending from body bolster 55. The bottom of boss 61 is vertically spaced from the bottom of recess 59, as is evident in FIG. 3, so that no vertical load is transmitted by boss 61 through recess 59, only horizontal forces, i.e., acceleration, retardation and lateral, all vertical loads being transmitted by feet 53 to the top surfaces 52 of bolster end portions 35.

The central portion 57 of bolster 33 is depressed to a substantially lower level than end portions 35 and is former with laterally outwardly facing upright stop surfaces 63 at its sides, and center transom 21 is formed with laterally inwardly facing upright surfaces 65, opposing bolster stop surfaces 63 and normally being laterally spaced from the latter when the bolster is in its normal laterally centered position on the truck frame. Frame lateral stop surfaces 65 preferably mount flat bumper pads 67 of elastomeric material which are adapted to engage bolster surfaces 63 and resiliently limit lateral movement of the bolster permitted by the yieldability in shear of sandwiches 37, 39.

The offset position of the pivot 59, 61 provides a moment arm, extending from the transverse center line of the truck to the pivot center, with which lateral forces along the transverse center line of the truck combine to create a torque urging bolster chafing plate 45 into engagement with cooperating truck frame chafing plate 47 thereby providing friction damping of the lateral movement of the bolster.

Operation of the truck is as follows: With all motors facing in the same direction, the motor torques tend to stabilize the truck against tilting about its transverse axis because they all act downwardly or upwardly in union on their supporting transoms. Lateral forces transmitted from the truck through the wheels and axles to the frame are partly absorbed by transverse movement of bolster 33 on the truck frame. By having the upper surfaces 52 of bolster end portions 35 centered lengthwise of the truck with respect to the axles, and by having the locomotive feet 53 similarly centered when the locomotive is in its normal position on tangent track, the load is equally distributed through truck frame side members 13, equalizer springs 29, and equalizer 27 to axles 3, 5, 7 and 9, the longitudinally offset portions of the bolster center portions 57 and pivot 59, 61 not affecting the distribution of vertical load. As the bolster moves transversely of the truck frame however, in response to lateral forces, these forces which produce the lateral movement, combine with their moment arm about the pivot 59, 61 (the distance the pivot center is offset lengthwise of the truck from the longitudinal center of the truck), to create a torque on the bolster, biasing the bolster diagonally and thus increasing on flat tops 41, frame side members 13, and caps 79 posing bolster and truck frame chafing plates 45, 47, depending upon the direction of the lateral force, to produce friction damping for the lateral movement of the bolster on elastomeric sandwiches 37, 39. Lateral movement of the bolster is limited by engagement of bolster lateral stop surfaces 63 with elastomeric bumpers 67 on the truck frame.

Figure 5:
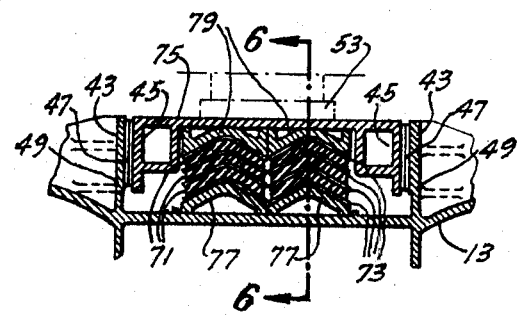
FIG. 5 is a fragmentary longitudinal vertical sectional view, corresponding to FIG. 4, but of a modified bolster lateral motion support device.
Figure 6:
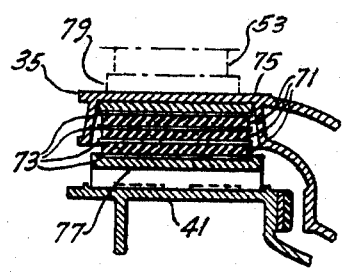
FIG. 6 is a transverse vertical sectional view along line 6—6 of FIG. 5.

In the modified form of the invention shown in FIGS. 5 and 6, instead of flat sandwiches 37, 39, the bolster is supported at each end on a pair of sandwiches of chevron cross section, comprising V-shaped pads 71 of elastomeric material interleaved with and bounded by similarly V-shaped metal plates 73. To accommodate the greater depth of chevron sandwiches 71, 73 the bottom of bolster end 35′ is upwardly recessed as at 75. Sandwiches 71, 73 are mounted between suitably shaped cast seats 77 resting on flat tops 41 frame side members 13, and caps 79 mounted in bolster recesses 75, sandwiches 71, 73 being positioned in side by side relation with their vertices extending transversely of the truck so that lateral motion of the bolster will be freely accommodated by the shear in the straight laterally extending direction of pads 71, while tendencies of the bolster to move lengthwise of the truck will be opposed by compression as well as shear resistance resulting from the inclination of pads 71 lengthwise of the truck.

The details of the truck may be modified substantially without departing from the spirit of the invention, and the exclusive use of such modifications as come within the scope of the appended claims is contemplated.

What is claimed is:

1. A railway motor truck comprising wheeled axles spaced apart longitudinally of the truck, a rigid truck frame supported at its sides on said axles and mounting at its sides a pair of transversely spaced vertical-load supporting bearings located at the balance points at the sides of said truck frame with respect to its supports from said axles, and a vertically unloaded vertical-axis pivot forming structure centered transversely of the truck and offset longitudinally from the centers of said bearings.

2. A railway motor truck according to claim 1 including a transverse bolster supported on said truck frame for limited lateral movement, said bearings and said pivot forming structure comprising a portion of said bolster.

3. A railway motor truck according to claim 2 in which said bolster has end portions elongated lengthwise of the truck, said bearings comprising similarly elongated top surfaces of said bolster end portions, and a transverse central portion offset lengthwise of the truck from the center of said end portions and including at its center said pivot forming structure.

4. A railway motor truck according to claim 3 in which said truck frame has transversely spaced longitudinally extending side members underlying said bolster end portions, pads of elastomeric material carried on said side members, the end portions of said bolster being seated on said pads for movement transversely of the truck through distortion of said pads in shear.

5. A railway motor truck according to claim 4, including cooperating elements on said frame and said bolster for preventing movement of said bolster lengthwise of said frame.

6. A railway motor truck according to claim 5 in which said cooperating elements comprise pairs of opposing transverse vertical surfaces on said bolster and said frame side members.

7. A railway motor truck according to claim 4 in which said pads are flat and horizontally disposed.

8. A railway motor truck according to claim 4 in which said pads are of inverted V-shape with their vertices extending transversely of the truck.

9. A railway motor truck according to claim 8 in which there is a pair of said V-shaped pads at each side of the truck frame, the pads of each pair being disposed longitudinally of the truck relative to each other.

10. A railway motor truck comprising a pair of wheeled axles spaced apart longitudinally of the truck, a rigid truck frame supported at each side on said axles, means spaced apart longitudinally of the truck and supporting said frame on said axles, said frame including transversely spaced longitudinally extending side members and a transverse transom connecting said side members intermediate said axles and offset lengthwise of the truck from the center of the space between said axles, a transverse bolster supported at its ends on said frame side members and including end portions elongated longitudinally of the truck and spaced apart transversely of the truck, and a transversely extending central portion connecting said end portions and offset lengthwise of said end portions in the same direction as said transom, said bolster central portion overlying said transom and including vertically unloaded vertical-axis pivot forming structure similarly offset from the centers of said bolster end portions, said elongated end portions overlying said frame side members and having upwardly facing load supporting surfaces elongated longitudinally of the truck with their centers at the balance points at the sides of said frame with respect to said frame supporting means.

References Cited

UNITED STATES PATENTS

| | | | |
|---|---|---|---|
| 2,099,031 | 11/1937 | Neal et al. | 105—197 |
| 2,184,102 | 12/1939 | Piron | 105—182 |
| 2,211,463 | 8/1940 | Hobson | 267—3 |
| 2,233,541 | 3/1941 | Latshaw | 105—183 |
| 2,321,845 | 6/1943 | Nystrom et al. | 105—197 |
| 2,925,789 | 2/1960 | Wintemberg | 105—199 |
| 3,277,843 | 10/1966 | Horner et al. | 105—183 |
| 3,313,244 | 4/1967 | Koci. | |

ARTHUR L. LA POINT, *Primary Examiner.*

H. BELTRAN, *Assistant Examiner.*